US012752788B2

(12) United States Patent
Su et al.

(10) Patent No.: US 12,752,788 B2
(45) Date of Patent: Oct. 6, 2026

(54) VEHICLE CONTROL METHOD AND APPARATUS, AND VEHICLE

(71) Applicant: Yinwang Intelligent Technologies Co., Ltd., Shenzhen (CN)

(72) Inventors: Qing Su, Shenzhen (CN); Wenxiao Hu, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 18/486,519

(22) Filed: Oct. 13, 2023

(65) Prior Publication Data

US 2024/0083438 A1 Mar. 14, 2024

Related U.S. Application Data

(63) Continuation of application No. PCT/CN2021/087220, filed on Apr. 14, 2021.

(51) Int. Cl.

| | |
|---|---|
| ***B60W 30/18*** | (2012.01) |
| ***B60W 50/14*** | (2020.01) |
| ***B60W 60/00*** | (2020.01) |

(52) U.S. Cl.

CPC ...... *B60W 30/18163* (2013.01); *B60W 50/14* (2013.01); *B60W 2050/143* (2013.01); *B60W 2050/146* (2013.01); *B60W 2540/20* (2013.01); *B60W 2552/53* (2020.02)

(58) Field of Classification Search

CPC ........... B60W 30/18163; B60W 50/14; B60W 2050/143; B60W 2050/146; B60W 2540/20; B60W 2552/53; B60W 2540/215; B60W 60/0024

USPC ........................................................... 701/26

See application file for complete search history.

(56) References Cited

U.S. PATENT DOCUMENTS

| | | | | |
|---|---|---|---|---|
| 2006/0152346 | A1* | 7/2006 | Maass | B60Q 9/008 340/425.5 |
| 2015/0338849 | A1* | 11/2015 | Nemec | G05D 1/0016 |
| 2016/0110617 | A1* | 4/2016 | Kawasaki | G06V 20/588 348/148 |
| 2017/0243491 | A1* | 8/2017 | Fujii | G08G 1/167 |
| 2018/0350242 | A1* | 12/2018 | Fujii | B60W 30/18163 |
| 2020/0377117 | A1* | 12/2020 | Nojiri | G08G 1/123 |
| 2021/0087756 | A1* | 3/2021 | Shah | E01C 5/00 |

FOREIGN PATENT DOCUMENTS

| | | | |
|---|---|---|---|
| CN | 109878523 | A | 6/2019 |
| CN | 110001782 | A | 7/2019 |
| CN | 110182209 | A | 8/2019 |
| CN | 111959507 | A | 11/2020 |
| CN | 112477856 | A | 3/2021 |
| DE | 102016221574 | A1 * | 5/2018 |

* cited by examiner

*Primary Examiner* — Hossam M Abd El Latif

(74) *Attorney, Agent, or Firm* — WOMBLE BOND DICKINSON (US) LLP

(57) ABSTRACT

A vehicle control method and apparatus 10, and a vehicle 100 are provided. The vehicle 100 has a cross-solid-line lane change permission switch 16. When the cross-solid-line lane change permission switch 16 is in an on state, and a driver switches a turn signal switch to a state that a left turn signal or a right turn signal is on, the vehicle 100 can cross a solid line to change a lane.

20 Claims, 10 Drawing Sheets

VEHICLE CONTROL METHOD AND APPARATUS, AND VEHICLE

CROSS-REFERENCE TO RELATED APPLICATIONS

This application is a continuation of International Application No. PCT/CN2021/087220, filed on Apr. 14, 2021, the disclosure of which is hereby incorporated by reference in its entirety.

TECHNICAL FIELD

This application relates to autonomous driving technologies, furthermore, to a vehicle control method and apparatus, and a vehicle.

BACKGROUND

With the development of artificial intelligence technologies, autonomous driving technologies are gradually and widely applied, so that driving burdens of drivers are reduced. For autonomous driving, for example, the international society of automotive engineers (SAE International) proposes five levels, to be specific, levels from L1 to L5. L1: driver assistance, which can assist a driver in completing some driving tasks and only one driving operation can be completed. L2: partial automation, in which operations of acceleration/deceleration and steering may be implemented automatically and simultaneously. L3: conditional automation, in which a vehicle may implement automatic acceleration/deceleration and steering in an environment without an operation from the driver. L4: high automation, in which the entire process of driving may be implemented without the driver, but there are restrictions. For example, a vehicle speed is limited within a specified value, and a driving region is relatively fixed. L5: full automation, which is completely self-adaptive to driving and adapts to any driving scenario.

Higher levels indicate stronger autonomous driving functions. However, current technologies are not capable of high-level autonomous driving. In some embodiments, for example, real-world traffic scenarios are very complex, with many scenarios not fully accounted for in a current autonomous driving technology, and compared with a driving capability of a human, the autonomous driving technology is lack of flexibility in adapting to a plurality of traffic scenarios, there is still room for improvement in the autonomous driving technology.

SUMMARY

This application provides a vehicle control method and apparatus, a vehicle, and the like, to improve flexibility of autonomous driving.

A first aspect of this application provides a vehicle control method. The method includes: detecting a first operation by a driver of a vehicle, where the first operation is used to instruct the vehicle to change from a current lane to a target lane; obtaining status information of a cross-solid-line lane change permission switch of the vehicle; and performing first control when the first operation is detected and the status information indicates that the cross-solid-line lane change permission switch is in an on state, where the first control includes enabling the vehicle to change a lane.

Herein, a cross-solid-line lane change means to cross a solid lane line to change a lane. With regard to the cross-solid-line lane change permission switch, as a name of the cross-solid-line lane change permission switch shows, when the cross-solid-line lane change permission switch is turned on, the vehicle is possible to cross a solid line to change a lane. When the cross-solid-line lane change permission switch is turned off, the vehicle is forbidden from crossing the solid line to change a lane.

According to the foregoing vehicle control method, when the first operation by the driver is detected and the cross-solid-line lane change permission switch is in the on state, the vehicle is enabled to automatically change the lane. In this way, for example, in a case of emergency avoidance, an autonomous vehicle can cross a solid line to change a lane, to avoid an accident or inconvenience caused by mechanically driving according to a rule of "forbidding crossing a solid line to change a lane", so that flexibility of control of autonomous driving can be improved.

In addition, an operation by the driver (a person) triggers the lane change, so that control of the person is maintained as a highest priority, subjective intervention permission of the person is maintained, and an autonomous driving technology better serves the person. Furthermore, highest determining permission of changing a lane is reserved for the driver, so that lack of autonomous driving technologies in determining of an emotion of the driver can be made up, personalized requirements of different drivers can be better met, and a driving intention of the driver can be better respected.

As an embodiment of the first aspect, the vehicle control method further includes: obtaining type information of a lane line between the current lane and the target lane. When the type information indicates that the lane line is a solid lane line, the first control further includes sending a prompt that indicates that the lane line is the solid lane line.

According to the foregoing manner, the prompt is sent when the lane line is the solid lane line, so that the driver can be warned to improve concentration, and a possibility that a misoperation causes driving danger can be suppressed.

For example, the prompt includes a sound effect prompt, a displayed text prompt, and/or a voice prompt.

As an embodiment of the first aspect, the first control includes: enabling the vehicle to change the lane after a preset time period that starts from when the first operation is detected.

According to the foregoing manner, the vehicle is enabled to change the lane after the preset time period, so that time for canceling lane change can be reserved for the driver, and a possibility that a misoperation causes driving danger can be suppressed.

In addition, as an embodiment of the first aspect, the first control includes: enabling the vehicle to change the lane within the preset time period if the first operation is detected again.

According to the foregoing manner, when the driver performs the first operation again, it may be considered that an intention of requiring the vehicle to change the lane is strong. In this case, the vehicle automatically changes the lane without waiting for the preset time period to pass, so that control that better meets an occupant intention can be performed.

As an embodiment of the first aspect, the first control further includes adjusting a lane change road condition parameter. The lane change road condition parameter indicates a requirement for a road condition of the target lane when the vehicle changes the lane. To satisfy an adjusted lane change road condition parameter is easier than to satisfy the lane change road condition parameter before adjustment.

The vehicle control method further includes: obtaining road condition information of the target lane; and enabling the vehicle to change the lane when a road condition indicated by the road condition information meets a requirement indicated by the adjusted lane change road condition parameter.

According to the foregoing manner, when an occupant requires to change the lane, it may be considered that the occupant has a relatively urgent requirement for changing the lane. Therefore, a road condition for lane change is more easily met by adjusting the lane change road condition parameter (a road condition requirement is reduced), and the vehicle can change the lane more easily, so that a requirement of the occupant can be more properly responded to.

As an embodiment of the first aspect, the first operation is to switch a turn signal switch to a state that a left turn signal or a right turn signal is on.

According to the foregoing manner, a turned-on operation of the turn signal switch is set to a triggering operation of sending a lane change instruction, so that the turned-on operation is consistent with a steering operation behavior when the driver performs manual driving. The driver is prevented from feeling that an operation is complex when another operation is newly defined, or from generating a misoperation during panic.

A second aspect of this application provides a vehicle control apparatus. The apparatus includes: an operation detection module, configured to detect a first operation by a driver of a vehicle, where the first operation is used to instruct the vehicle to change from a current lane to a target lane; a switch status obtaining module, configured to obtain status information of a cross-solid-line lane change permission switch of the vehicle; and a control module, configured to perform first control when the first operation is detected and the status information indicates that the cross-solid-line lane change permission switch is in an on state, where the first control includes enabling the vehicle to change a lane.

According to the foregoing vehicle control apparatus, when the first operation by the driver is detected and the cross-solid-line lane change permission switch is in the on state, the vehicle is enabled to change the lane. In this way, for example, in a case of emergency avoidance, an autonomous vehicle can cross a solid line to change a lane, to avoid an accident or inconvenience caused by mechanically driving according to a rule of "forbidding crossing a solid line to change a lane", so that flexibility of control of autonomous driving can be improved.

As an embodiment of the second aspect, the vehicle control apparatus further includes: a lane line type obtaining module, configured to obtain type information of a lane line between the current lane and the target lane. When the type information indicates that the lane line is a solid lane line, the first control further includes sending a prompt that indicates that the lane line is the solid lane line.

According to the foregoing manner, the prompt is sent when the lane line is the solid lane line, so that the driver can be warned to improve concentration, and a possibility that a misoperation causes driving danger can be suppressed.

As an embodiment of the second aspect, the prompt includes a sound effect prompt, a displayed text prompt, and/or a voice prompt.

As an embodiment of the second aspect, after a preset time period that starts from when the first operation is detected by the operation detection module, the control module enables the vehicle to change the lane.

According to the foregoing manner, the vehicle is enabled to change the lane after the preset time period, so that time for canceling lane change can be reserved for the driver, and a possibility that a misoperation causes driving danger can be suppressed.

As an embodiment of the second aspect, within the preset time period, when the operation detection module detects the first operation again, the control module enables the vehicle to change the lane.

According to the foregoing manner, when the driver performs the first operation again, it may be considered that an intention of requiring the vehicle to change the lane is strong. In this case, the vehicle changes the lane without waiting for the preset time period to pass, so that control that better meets an occupant intention can be performed.

As an embodiment of the second aspect, the first control performed by the control module further includes adjusting a lane change road condition parameter. The lane change road condition parameter indicates a requirement for a road condition of the target lane when the vehicle changes the lane. To satisfy an adjusted lane change road condition parameter is easier than to satisfy the lane change road condition parameter before adjustment. The vehicle control apparatus further includes a road condition obtaining module, configured to obtain road condition information of the target lane. When a road condition indicated by the road condition information meets a requirement indicated by the adjusted lane change road condition parameter, the control module performs control that is to enable the vehicle to change the lane.

According to the foregoing manner, when an occupant requires to change the lane, it may be considered that the occupant has a relatively urgent requirement for changing the lane. Therefore, a road condition for lane change is more easily met by adjusting the lane change road condition parameter (a road condition requirement is reduced), and the vehicle can change the lane more easily, so that a requirement of the occupant can be more properly responded to.

As an embodiment of the second aspect, the first operation is to switch a turn signal switch to a state that a left turn signal or a right turn signal is on.

According to the foregoing manner, a turned-on operation of the turn signal switch is set to a triggering operation of sending a lane change instruction, so that the turned-on operation is consistent with a steering operation behavior when the driver performs manual driving. The driver is prevented from feeling that an operation is complex when another operation is newly defined, or from generating a misoperation during panic.

A third aspect of this application provides a vehicle. The vehicle includes the vehicle control apparatus of any one of the foregoing structures.

According to the vehicle, when a first operation by a driver is detected and a cross-solid-line lane change permission switch is in an on state, the vehicle is enabled to change a lane. In this way, for example, in a case of emergency avoidance, an autonomous vehicle can cross a solid line to change a lane, to avoid an accident or inconvenience caused by mechanically driving according to a rule of "forbidding crossing a solid line to change a lane", so that flexibility of control of autonomous driving can be improved.

As an embodiment of the third aspect, the vehicle is a specialized vehicle that includes an ambulance, a fire truck, a police vehicle, or an engineering rescue vehicle.

Compared with household vehicles and the like, the specialized vehicles have more cases of crossing solid lines to change lanes. Therefore, control of autonomous driving can be more flexible when the vehicle control apparatus is applied to the specialized vehicles.

A fourth aspect of this application provides a computer-readable storage medium. The computer-readable storage medium stores program instructions. When the program instructions are executed by a computer, the computer performs any one of the foregoing vehicle control methods.

These aspects and another aspect of this application will be clearer and easier to understand in descriptions of the following (a plurality of) embodiments.

BRIEF DESCRIPTION OF DRAWINGS

The following further describes features of this application and a relationship between the features with reference to the accompanying drawings. The accompanying drawings are all examples, and some features are not shown in actual proportions. In addition, in some accompanying drawings, common features that are not mandatory for this application in the field of this application may be omitted. Alternatively, additional features that are not mandatory for this application are not shown. A combination of the features shown in the accompanying drawings is not intended to limit this application. In addition, in this specification, content referred to by same reference signs is also the same. The accompanying drawings are described as follows.

DESCRIPTION OF EMBODIMENTS

First, some examples of application scenarios of this application are described.

Figure 1:
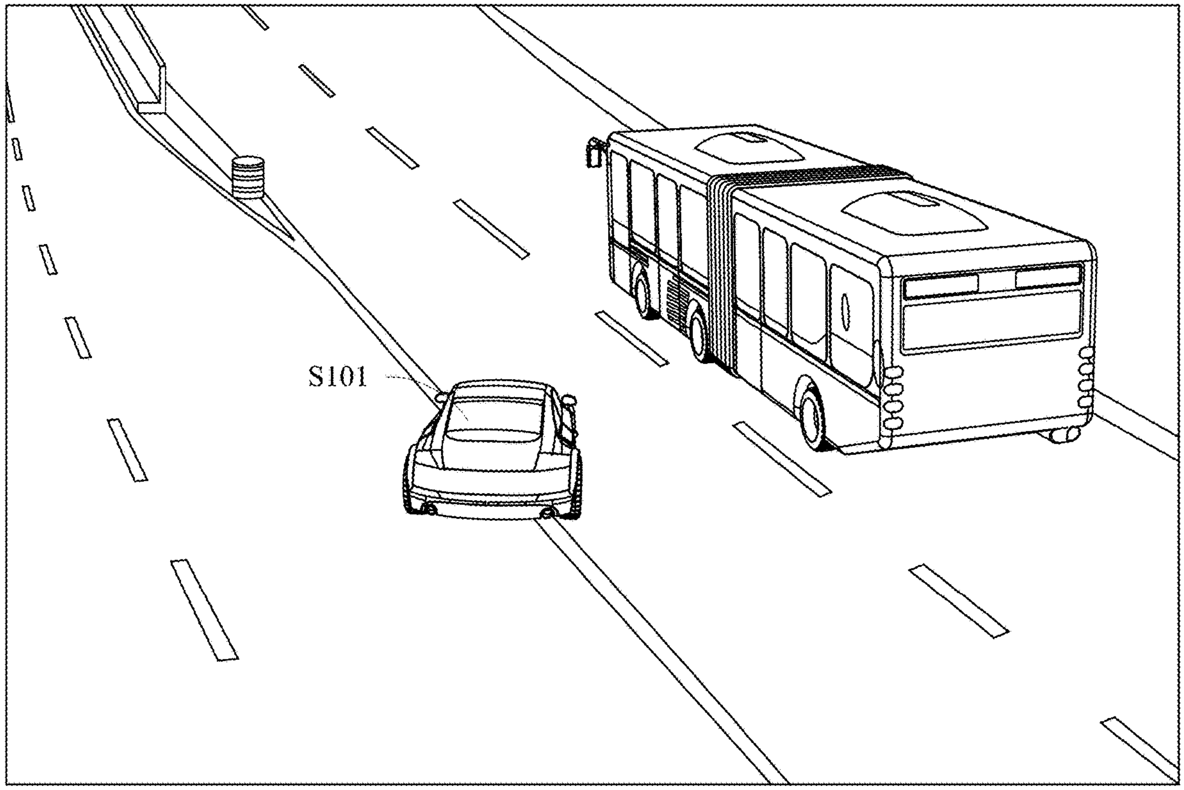
FIG. 1 is a schematic diagram of an example of an application scenario according to this application.

FIG. 1 is an example of an application scenario according to this application. As shown in FIG. 1, a vehicle 101 is nearing a ramp opening of a highway, and a driver intends to drive out of the highway from the ramp opening. However, the vehicle 101 is about to miss the ramp opening. In this case, the driver expects the vehicle 101 to cross a solid line to change a lane and drive into the ramp opening.

Figure 2:
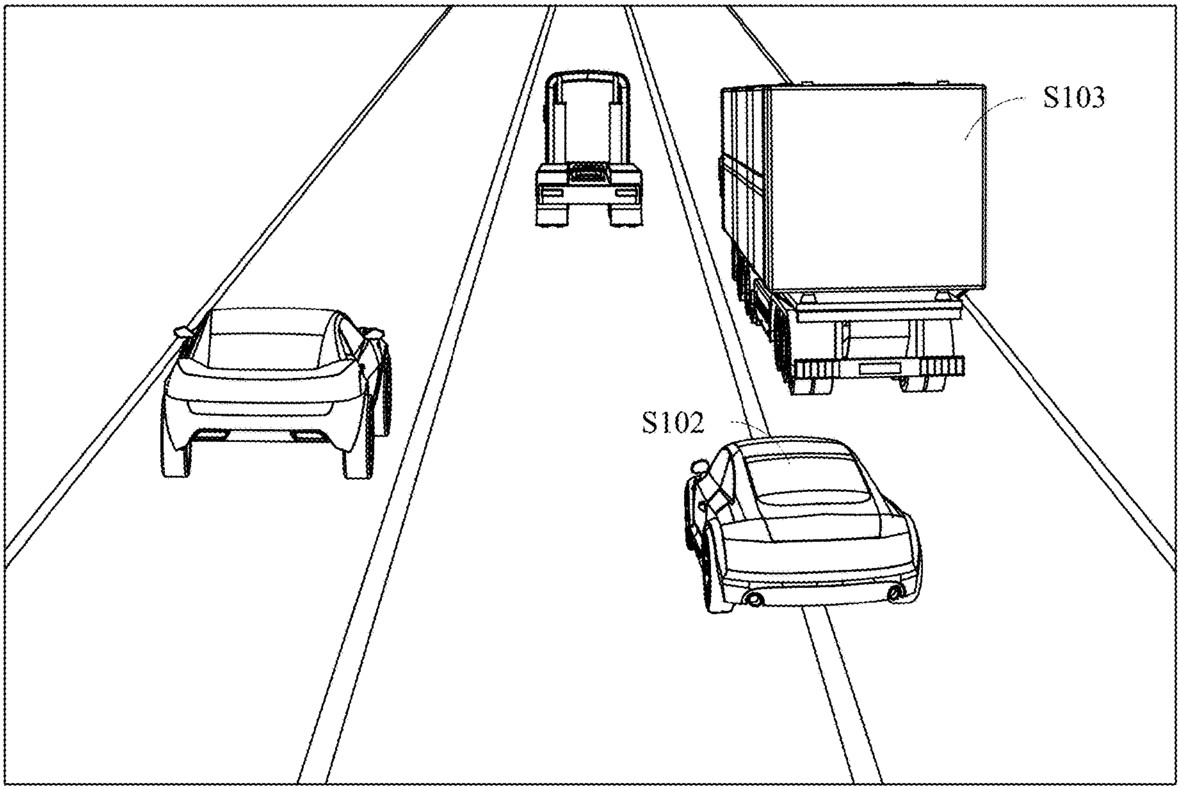
FIG. 2 is a schematic diagram of another example of an application scenario according to this application.

FIG. 2 is another example of an application scenario according to this application. As shown in FIG. 2, there is a vehicle 103 that brakes abruptly in front of a vehicle 102, and the vehicle 102 risks colliding with the vehicle 103. In this case, a driver of the vehicle 102 expects the vehicle 102 to cross a solid line to change a lane leftward of a current lane of the vehicle 102, to avoid collision with the vehicle 103.

Figure 3:
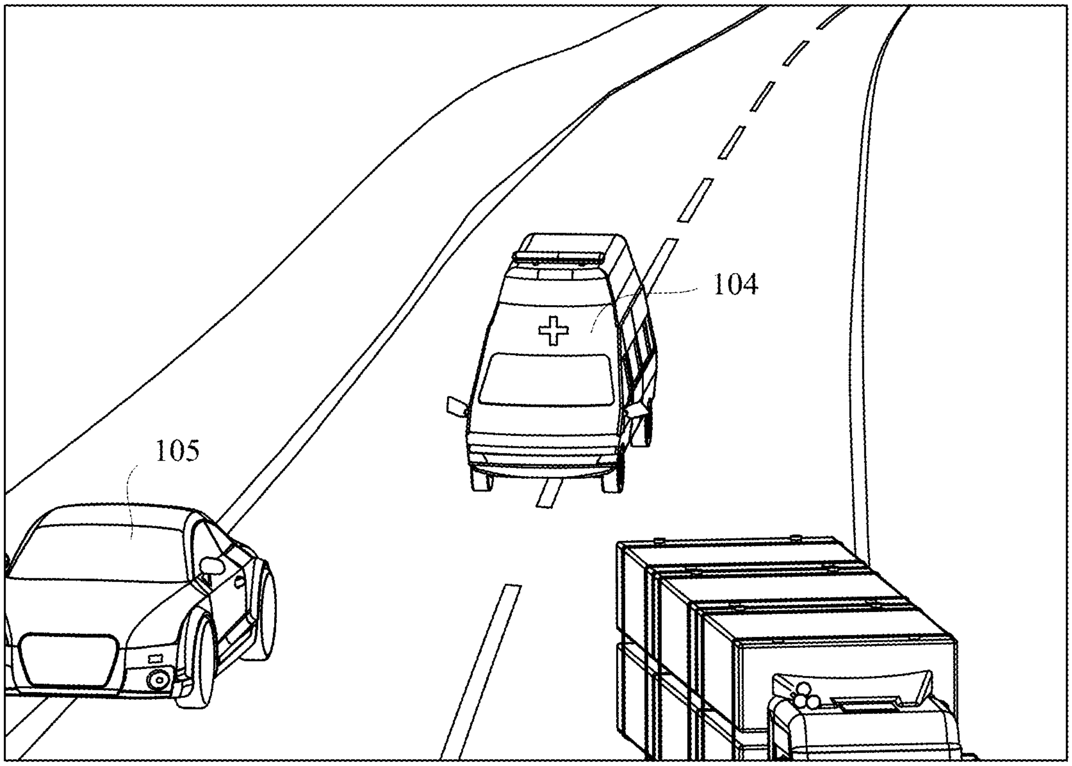
FIG. 3 is a schematic diagram of still another example of an application scenario according to this application.
Figure 4A:
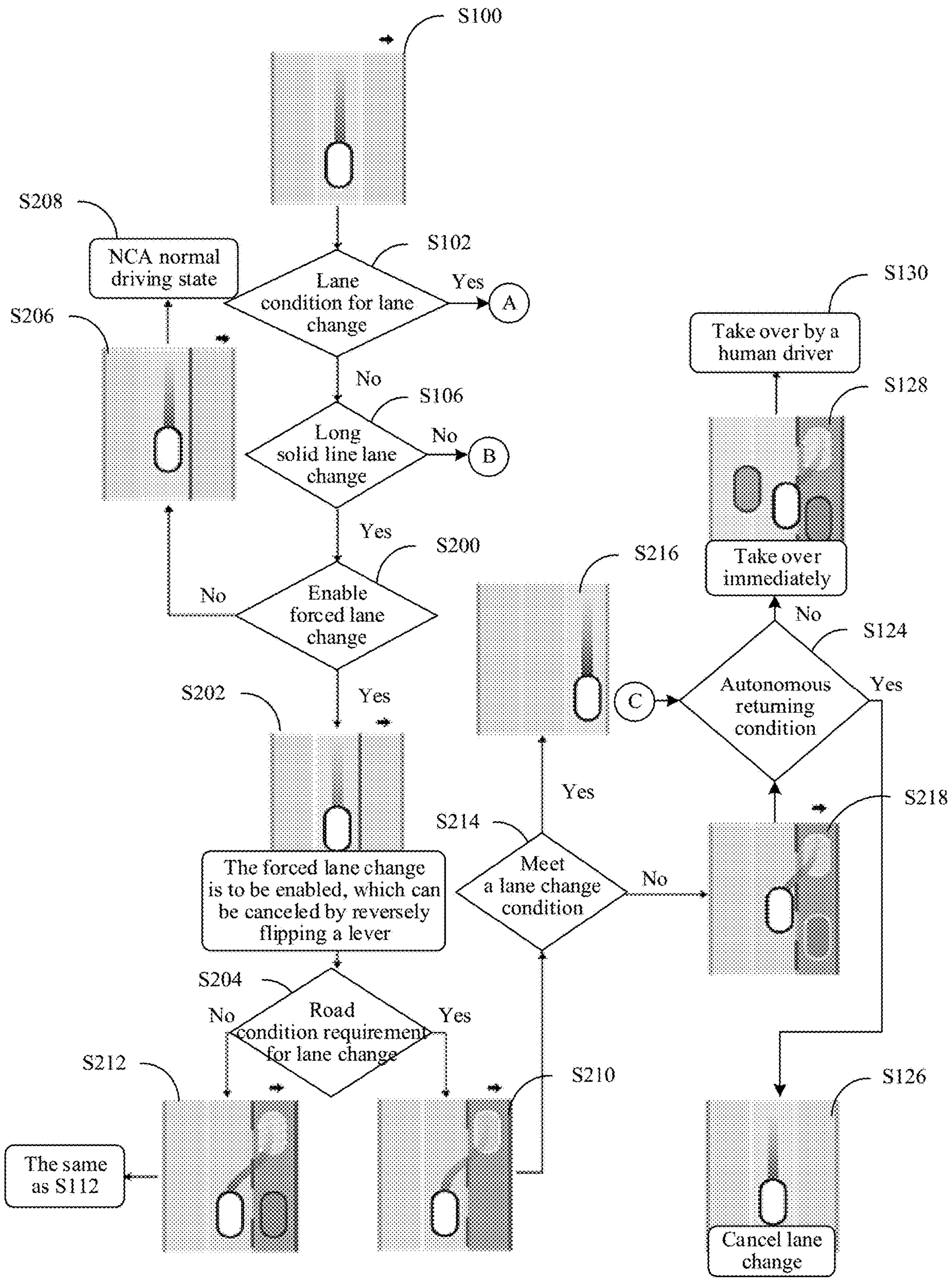
FIG. 4A and FIG. 4B are a schematic flowchart of autonomous lane change according to an embodiment of the application.
Figure 4B:
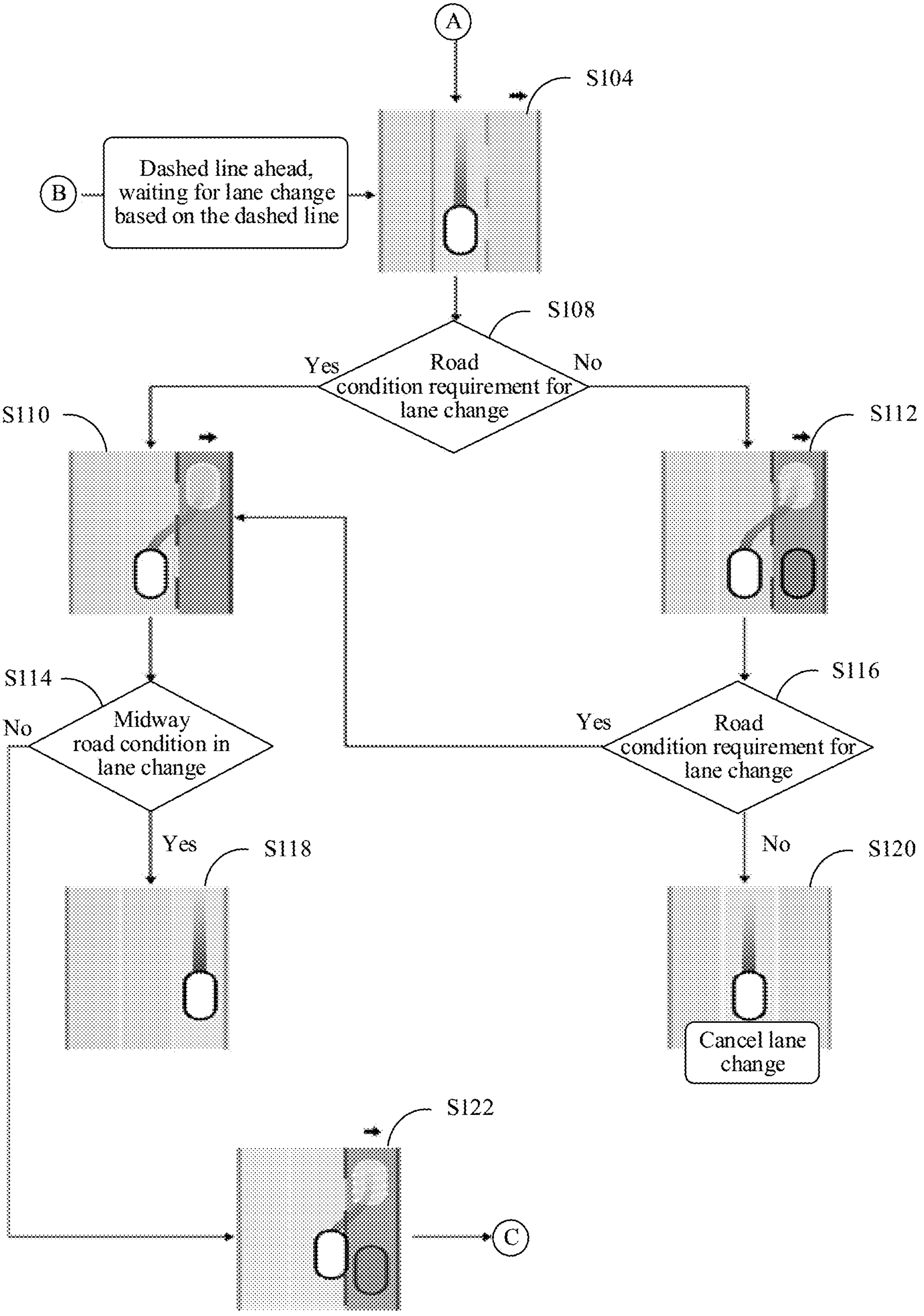

FIG. 3 is another example of an application scenario according to this application. As shown in FIG. 3, an ambulance 104 drives on a congested road. To give way to the ambulance 104, a driver of a vehicle 105 expects the vehicle 105 to cross a solid line to change a lane rightward of a current lane of the vehicle 105. In addition, in addition to the ambulance, specialized vehicles include a fire truck, a police vehicle, and an engineering rescue vehicle. When driving on the road, a case of giving way to these specialized vehicles may be met. In addition, for these specialized vehicles, there is also a requirement of crossing a solid line to change a lane.

As described above, in an actual case, there are many requirements for crossing a solid line to change a lane. In response to these requirements, this application provides a technology that can enable a vehicle to cross a solid line to change a lane under an autonomous driving mode, to expand a scenario coverage of autonomous driving, improve flexibility of autonomous driving, and better adapt to an intention or a personalized requirement of a driver.

In some embodiments, this application mainly provides a vehicle control method, a vehicle control apparatus, a vehicle, a computer program, a computer-readable storage medium, and a computing device.

Figure 10:
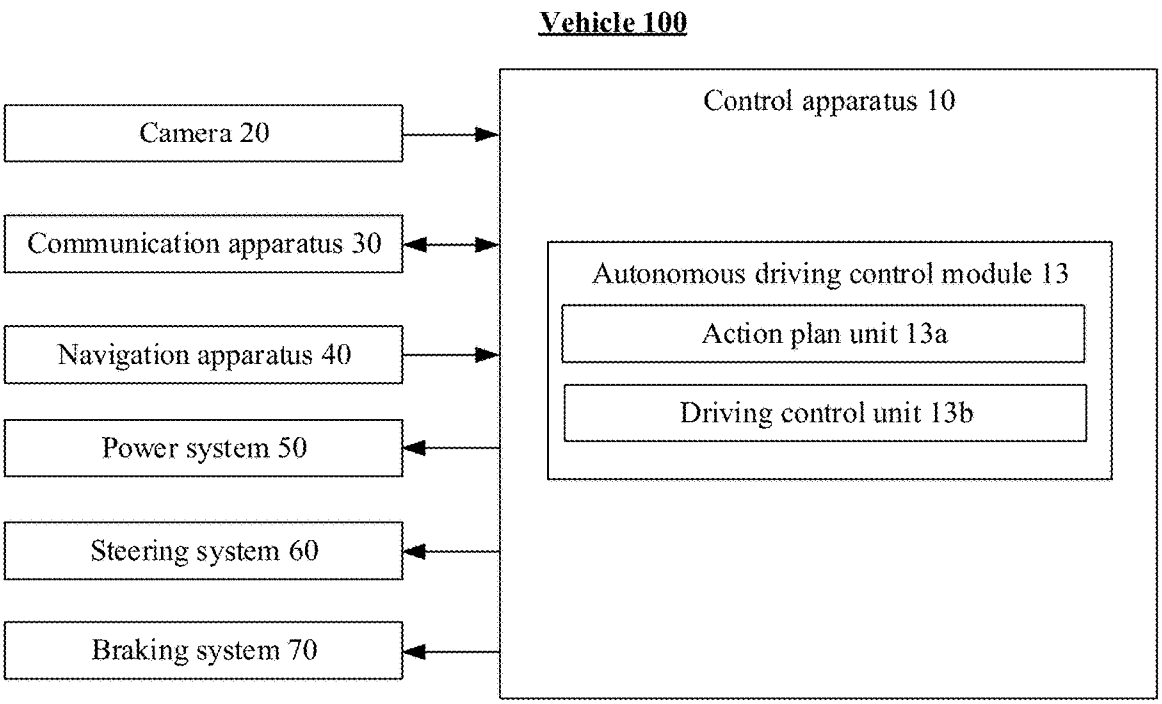
FIG. 10 is a schematic block diagram of a structure of a vehicle according to an embodiment of the application.

The following describes a general structure of a vehicle with an autonomous driving mode. FIG. 10 is a schematic block diagram of a structure of a vehicle with an autonomous driving mode according to an embodiment of the application.

As shown in FIG. 10, a vehicle 100 includes a control apparatus 10, a camera 20, a communication apparatus 30, a navigation apparatus 40, a power system 50, a steering system 60, and a braking system 70. In addition, the vehicle 100 further includes a steering lever (a turn signal switch). The steering lever includes three states: a state to enable a right turn signal to turn on, an off state (a neutral location), and a state to enable a left turn signal to turn on. In addition, the vehicle 100 further includes structural elements other than these structural elements, but descriptions are omitted herein.

The camera 20 is configured to detect a vehicle's external environment. It can include one or more cameras. The camera 20 is an example of an external environment sensor. In addition, a laser radar, a millimeter-wave radar, and the like may further be disposed to detect the environment outside the vehicle.

The communication apparatus 30 can perform wireless communication with an external object that is not shown in the figure. The external object may include, for example, a base station, a cloud server, a mobile terminal (like a smartphone), a roadside device, another vehicle, and the like that are not shown in the figure.

The navigation apparatus 40 typically includes a GNSS (Global Navigation Satellite System) receiver and a map database that are not shown in the figure. The navigation apparatus 40 can determine a location of the vehicle 100 through a satellite signal received by the GNSS receiver, and can generate a route to a destination based on map information in the map database and provide information about the route to the control apparatus 10. In addition, the navigation apparatus 40 may further include an IMU (Inertial Measurement Unit), and perform positioning by combining information of the GNSS receiver and information of the IMU.

The power system 50 includes a drive ECU and a drive source that are not shown in the figure. The drive ECU controls a driving force (torque) of the vehicle 100 by controlling the drive source. As an example, the drive source may be an engine, a drive motor, and the like. The drive ECU can control the drive source based on an operation by the driver on an accelerator pedal, to control the driving force. In addition, the drive ECU can alternatively control the drive source based on an instruction sent from the vehicle control apparatus 10, to control the driving force. The driving force of the drive source is transferred to a wheel that is not shown in the figure by a transmission and the like that are not shown in the figure, to drive the vehicle 100.

The steering system 60 includes a steering ECU, to be specific, an EPS (Electric Power Steering) ECU, which is not shown in the figure, and an EPS motor that is not shown in the figure. The steering ECU can control the EPS motor based on an operation by the driver on a steering wheel, to control an orientation of the wheel (in some embodiments, a steerable wheel). In addition, the steering ECU can alternatively control the EPS motor based on the instruction sent from the vehicle control apparatus 10, to control an orientation of the wheel. In addition, a steering operation can also be performed by changing torque distribution or braking force distribution that are of left and right wheels.

The braking system 70 includes a braking ECU and a braking mechanism that are not shown in the figure. The braking mechanism enables a braking part to operate, by using a braking motor, hydraulic mechanism, and the like. The braking ECU can control the braking mechanism based on an operation by the driver on a braking pedal, to control braking force. In addition, the braking ECU can alternatively control the braking mechanism based on the instruction sent from the vehicle control apparatus 10, to control the braking force. When the vehicle 100 is an electric vehicle or a hybrid vehicle, the braking system 70 may further include an energy recovery braking mechanism.

The vehicle control apparatus 10 may be implemented by one ECU (Electronic Control Unit), or by a combination of a plurality of ECUs. The ECU is a computing device that includes a processor, a memory, and a communication interface that are connected through an internal bus. The memory stores program instructions. When the program instructions are executed by the processor, corresponding functions of a functional module and a functional unit are implemented. These functional modules and function units include a control module 13, and an operation detection module 11, a switch status obtaining module 12, a lane line type obtaining module 14, a road condition obtaining module 15 (FIG. 7 and FIG. 9), and the like that are described in detail in the following. The control module 13 may further include an action plan unit 13*a*, a driving control unit 13*b*, a prompt unit 13*c* (FIG. 7), a lane change road condition parameter adjustment unit 13*d* (FIG. 9), and the like.

To be specific, the vehicle control apparatus 10 implements these functional modules and/or functional units by executing a program (software) by the processor. However, the vehicle control apparatus 10 may also implement all or some of these functional modules and/or functional units by using hardware such as LSI (Large Scale Integration) and an ASIC (Application-Specific Integrated Circuit), or by using a combination of software and hardware.

In addition, the control module 13 is configured to control the vehicle 100 to drive autonomously (to move autonomously), and the like, and includes the action plan unit 13*a* and the driving control unit 13*b*.

The action plan unit 13*a* is configured to: calculate a target track of the vehicle 100 to a destination, determine a driving status of the vehicle 100 based on external environment information detected by an optical sensor like the camera 20, and update the target track to determine various actions of the vehicle 100. A path calculated by the navigation apparatus 40 is a rough path. In contrast, in addition to the rough path calculated by the navigation apparatus 40, the target track calculated by the action plan unit 13*a* further includes detailed content that is used to control acceleration/deceleration and steering of the vehicle 100.

The driving control unit 13*b* generates, based on an action plan provided by the action plan unit 13*a*, control instructions that are sent to the power system 50, the steering system 60, and the braking system 70, so as to control the power system 50, the steering system 60, and the braking system 70, so that the vehicle 100 drives based on the action plan.

With the foregoing structures, the vehicle 100 can implement autonomous driving modes such as a navigation cruise assistant (NCA) and an intelligent cruise assistant (ICA), and drive autonomously in the autonomous driving modes. The vehicle control method, the vehicle control apparatus, and the like that are in embodiments of the application may be implemented on an autonomous driving vehicle whose autonomous driving level is L2 to L5.

Refer to FIG. 4A and FIG. 4B to FIG. 7. The following describes in detail a vehicle control method and the like according to an embodiment of the application.

This implementation relates to a vehicle control method for autonomous lane change when an autonomous vehicle is in an autonomous driving mode. The vehicle control method is applied to the foregoing autonomous driving vehicle (referred to as an autonomous vehicle below).

The autonomous driving mode herein includes, for example, an ICA mode and an NCA mode. Both of the two modes belong to one of the autonomous driving modes. A main difference lies in that: generally, in the NCA mode, the autonomous vehicle drives according to a navigation path, and therefore, there is a case of autonomous lane change; however, in the ICA mode, if a driver does not actively send an autonomous lane change instruction as described below, the vehicle usually does not automatically change a lane.

In addition, the vehicle control method according to this implementation may be further applicable to another autonomous driving mode in addition to the ICA mode and the NCA mode.

In an embodiment, when the autonomous vehicle is in the autonomous driving mode like the ICA mode or the NCA mode, a navigation picture is simultaneously displayed on an on-board display, and a scenario in which the autonomous vehicle drives on a road is schematically displayed in the navigation picture. As an embodiment, the navigation picture may not be displayed, or the driver selects whether to display the navigation picture. In addition, in an embodiment, an example in which the road includes three lanes, a middle lane is a current lane on which the autonomous vehicle drives, and a right lane is a target lane that the autonomous vehicle intends to drive into is used for description.

In an embodiment, a lane change procedure in the NCA mode is the same as a lane change procedure in the ICA mode. A main difference between the two is that displayed content of navigation pictures is different. In some embodiments, as shown in the figure, in the NCA mode, in the navigation picture, an indication line is displayed in front of the autonomous vehicle, and the indication line indicates a navigation path. However, in the ICA mode, the indication line is not displayed.

The following describes in detail a lane change processing procedure in an embodiment by using the NCA mode as an example.

In S100, in the NCA mode, an autonomous lane change instruction actively sent by a driver is obtained. Herein, the driver actively sends the autonomous lane change instruction. For example, the driver manually flips a steering lever (a turn signal switch) to switch the steering lever to a state to enable a right turn signal to turn on (blinking). In this case, a control apparatus obtains a signal indicating that the steering lever is in the state, to be specific, receives the autonomous lane change instruction actively sent by the driver. Herein, an operation that the driver manually flips the steering lever to switch the steering lever to states to enable the right turn signal and the left turn signal to turn on is defined as an operation of sending the autonomous lane change instruction, which is used to instruct the autonomous vehicle to change from the current lane to the target lane.

Then, in S102, whether a lane condition for lane change is met is determined. In some embodiments, whether a lane line is a solid lane line or a dashed lane line is determined based on type information of the lane line between the current lane on which the vehicle drives and the target lane that the vehicle intends to drive into. When the lane line is the solid lane line, the vehicle is usually forbidden from changing to the target lane according to traffic rules. In this case, it is determined that the lane condition for lane change is not met. When the lane line is the dashed lane line, the vehicle is allowed to change to the target lane according to the traffic rules. In this case, it is determined that the lane condition for lane change is met.

Herein, according to the traffic rules, the solid lane line is a lane change forbidden identifier, to be specific, according to traffic rules, the vehicle is forbidden from crossing the solid lane line to change the lane. The type information of the lane line between the current lane and the target lane may be obtained, for example, from electronic map data, or based on image data captured by a camera included in the vehicle. In addition, in an actual case, the lane line may be a marking formed by a solid line and a dashed line parallel to the solid line. In this case, if a current lane side is the solid line and a target lane side is the dashed line, the lane line belongs to the solid lane line in this application. If the current lane side is the dashed line and the target lane side is the solid line, the lane line does not belong to the solid lane line in this application.

Furthermore, as the lane change forbidden identifier, in addition to a lane line identifier, there is a roadside signboard (for example, a no overtaking signboard). Therefore, a type of the lane line between the current lane and the target lane may be learned by detecting the roadside signboard (especially, for example, it is difficult to detect the lane line based on road image data captured by the camera when it snows). Therefore, the "type information of a lane line" in this application includes roadside signboard information that can indicate a lane line type.

When a determining result in S102 is "no", to be specific, the lane condition for lane change is not met, in S106, whether the lane line between the current lane and the target lane is a long solid lane line is determined. To be specific, whether the solid lane line extends in front of the vehicle for a specified distance is determined. If the solid lane line does not extend for the specified distance, it indicates that there is the dashed lane line not far ahead. When a determining result in S106 is "no", to be specific, the lane line between the current lane and the target lane is not the long solid lane line, processing in S104 is performed, and lane change waiting is performed.

In addition, when a determining result in S106 is "yes", to be specific, the lane line between the current lane and the target lane is the long solid lane line, in S200, whether a cross-solid-line lane change permission switch is in an on state is determined. In some embodiments, status information of the cross-solid-line lane change permission switch is obtained, and whether the cross-solid-line lane change permission switch is in the on state is determined based on the status information. Herein, as a meaning indicated by a name of the cross-solid-line lane change permission switch, the cross-solid-line lane change permission switch is configured to permit and forbid the vehicle to cross a solid line to change a lane. The on state of the cross-solid-line lane change permission switch indicates that the vehicle is permitted to cross a solid line to change a lane. To be specific, the vehicle is possible to cross a solid line to change a lane. An off state indicates that the vehicle is forbidden from crossing a solid line to change a lane. In an embodiment, the cross-solid-line lane change permission switch is a virtual switch, and is integrated in the vehicle control apparatus. In an embodiment, the cross-solid-line lane change permission switch may also be a physical switch, for example, disposed on an instrument board. In addition, the cross-solid-line lane change permission switch may be a dedicated switch, or a multi-purpose switch. Herein, the dedicated switch means that the cross-solid-line lane change permission switch includes only functions of permitting and forbidding the vehicle to cross a solid lane line to change a lane. The multi-purpose switch means that other functions are further included, for example, functions of permitting and forbidding the vehicle to drive beyond a lane speed limit. To be specific, when the switch is turned on, the vehicle is permitted to cross a solid lane line to change a lane and drive beyond a lane speed limit; and when the switch is turned off, the vehicle is forbidden from crossing a solid lane line to change a lane and driving beyond a lane speed limit.

Figure 5:
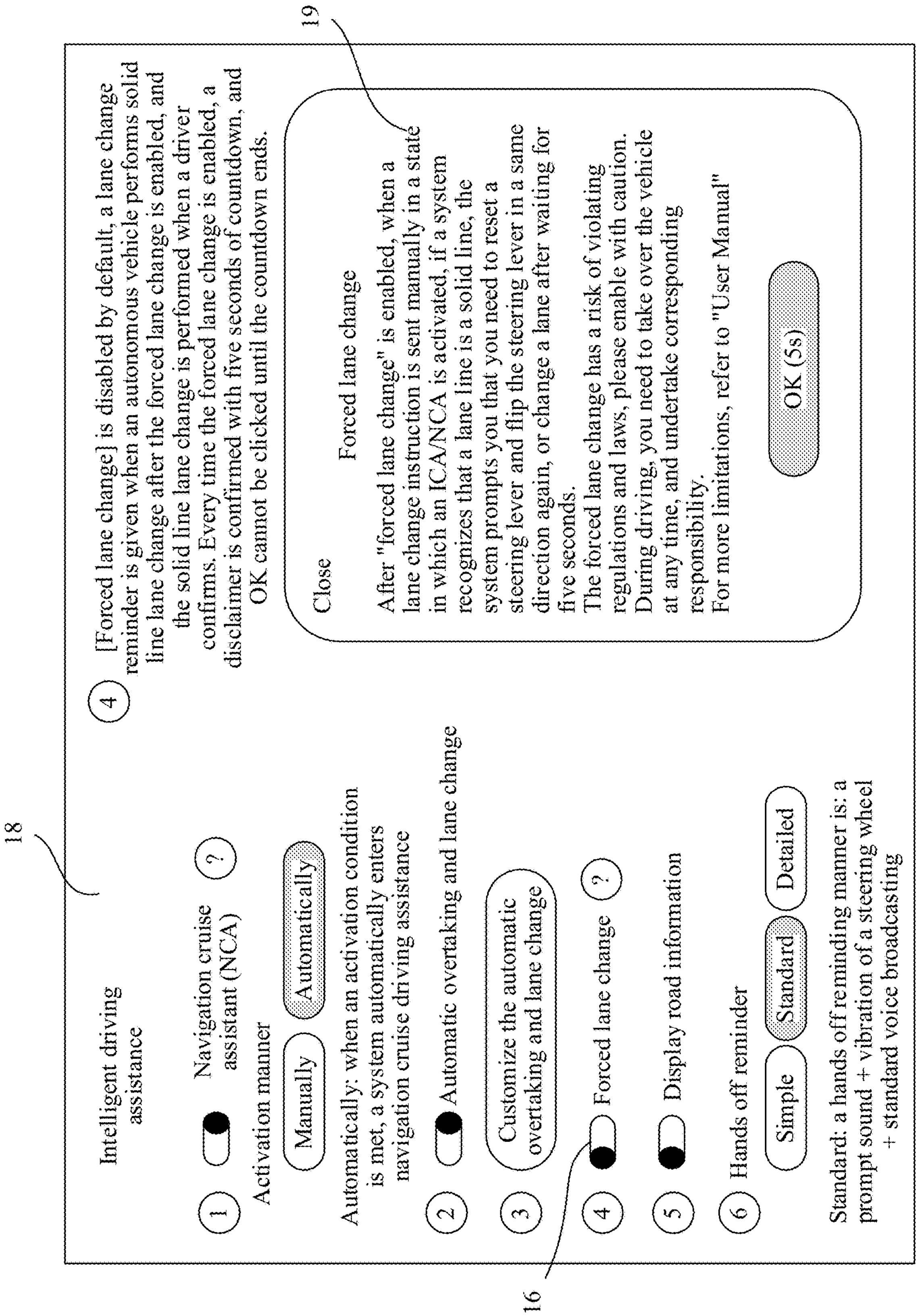
FIG. 5 is a schematic illustration diagram of a cross-solid-line lane change permission switch according to an embodiment of the application.

FIG. 5 shows an example of the cross-solid-line lane change permission switch (in an embodiment).

As shown in FIG. 5, in this example, the cross-solid-line lane change permission switch is a virtual switch, and a name of the cross-solid-line lane change permission switch is displayed as "forced lane change", which does not change an essential function of the cross-solid-line lane change permission switch. In addition, in this example, the cross-solid-line lane change permission switch 16 is displayed together with another switch and the like in an autonomous driving mode (in some embodiments, the NCA mode in the figure) setting interface 18. When the driver clicks the cross-solid-line lane change permission switch 16 and intends to turn on the switch, a confirmation interface 19 for asking the driver whether to confirm to turn on the switch is popped up. A disclaimer is also displayed in the confirmation interface, to notify the driver that clicking the confirmation key means signing the disclaimer.

When a determining result in S200 is "no", to be specific, the cross-solid-line lane change permission switch is in the off state, in S206, a prompt is sent to the driver to notify the driver that the lane change cannot be performed. As an example of the prompt, in an embodiment, the lane line of the target lane is highlighted, for example, highlighted in red, and blinks. In addition, a voice prompt may be further sent by using a speaker of the autonomous vehicle. After a preset time period (for example, 3 seconds) that starts from when the information is sent, or after a preset time period that starts from when an autonomous lane change instruction is obtained from the driver, in S208, common NCA control is performed.

In addition, when a determining result in S200 is "yes", to be specific, the cross-solid-line lane change permission switch is in the on state, in S202, lane change preparation control is performed. For example, the lane line of the target lane is highlighted in the navigation picture, for example, highlighted in red, to notify the driver that the autonomous vehicle is to cross a solid line to change a lane. In addition, a sound effect prompt may further be sent, for example, a "beep" sound is sent by using a speaker. Control of sending these prompts used to indicate that the lane line is the solid lane line is an example of the first control in this application.

In addition, in S202, the driver is further notified, in a text and/or voice manner, that an operation of canceling to cross a solid line to change a lane can be performed. The operation is, for example, reversely flipping the steering lever, to be specific, switching the steering lever to a state to enable a right turn signal to turn off. Control of sending the prompt used to "notify the driver that an operation of canceling to cross a solid line to change a lane can be performed" is an example of the first control in this application.

Then, in S204, whether a road condition requirement for lane change is met is determined, to be specific, whether road conditions of the current lane and the target lane allow the autonomous vehicle to change the lane is determined. For example, when there is no other vehicle in a preset range on the target lane, it is determined that the road condition requirement for lane change is met. When there is another vehicle in the preset range on the target lane (for example, refer to a case of "there is another vehicle in parallel with the autonomous vehicle on the target lane" shown in S212), it is determined that the road condition requirement for lane change is not met. The preset range herein is an example of a lane change road condition parameter in this application.

When a determining result in S204 is "no", to be specific, the road condition requirement for lane change is not met, in S212, waiting control is performed, to wait for the road condition of the target lane to change to a case in which the autonomous vehicle can be allowed to change the lane. In addition, the target lane is highlighted in the navigation picture, for example, highlighted in red, to prompt the driver that "the vehicle cannot change to the target lane now". In addition, in the navigation picture, the lane line between the current lane and the target lane is further highlighted by using a dashed line, to prompt the driver that "the vehicle considers the lane line between the current lane and the target lane as a dashed lane line". A color of the dashed lane line may be the same as a displayed color (red) of the target lane. A manner of "using a dashed line to highlight the lane line between the current lane and the target lane" herein may be to change a lane line that is originally displayed as a solid line into a dashed line, or to superimpose a dashed line of a different color and/or a thick dashed line on a basis of a solid line.

In addition, in the navigation picture, a target location (a location on the target lane existing when the autonomous vehicle completes lane change) of the autonomous vehicle is further displayed on the target lane, and a shadow line is displayed on the target location, to prompt the driver that the autonomous vehicle cannot change to the target location currently. Processing in S212 is the same as processing in S112, and subsequent processing is also the same. Details are described in the following.

When a determining result in S204 is "yes", to be specific, a road condition requirement for lane change is met, and when the driver does not perform an operation of canceling to cross a solid line to change a lane within a preset time period (for example, 5 seconds), or when the driver resets the steering lever (turns off the turn signal switch) and then flips the steering lever in a same direction again within a preset time period (for example, 5 seconds), in S210, control of enabling the autonomous vehicle to automatically cross a solid line to change a lane is performed. To be specific, the autonomous vehicle drives into the target lane by controlling an accelerator pedal, a steering wheel, and the like. The preset time period herein may start from receiving an autonomous lane change instruction that is from the driver. The control of enabling the autonomous vehicle to automatically cross a solid line to change a lane is performed only after the preset time period, so that a time can be reserved for the driver to cancel the operation. In addition, when the driver resets the steering lever and then flips the steering lever in the same direction again, it may be considered that the driver urges the vehicle to quickly perform autonomous lane change. In this case, there is a high probability that this is an emergency. Therefore, in this case, control of automatically crossing a solid line to change a lane is immediately performed without waiting for the preset time period to pass, and control that better meets an intention of the driver can be performed. In addition, the "control of enabling the autonomous vehicle to automatically cross a solid line to change a lane" herein is an example of the first control in this application.

In addition, in S210, the target lane is further highlighted in the navigation picture, and may be highlighted by using a color different from a color used when the road condition requirement for lane change is not met, for example, blue, to prompt the driver that "the vehicle is to change to the target lane". In addition, in the navigation picture, the lane line between the current lane and the target lane is highlighted by using a dashed line, to prompt the driver that "the vehicle considers the lane line between the current lane and the target lane as a dashed lane line". A color of the dashed lane line may be the same as a displayed color (blue) of the target lane.

In addition, a target location (a location on the target lane existing when the autonomous vehicle completes lane change) of the autonomous vehicle is further displayed on the target lane. The displayed target location does not include the "shadow line" in S212, to be specific, a display manner is different from a display manner in S212, to prompt the driver that the autonomous vehicle can change to the target location in this case.

In addition, in S210, for example, a prompt text may be displayed on the navigation picture, to notify the driver that the lane change can be canceled through a preset operation. Alternatively, the prompt text is displayed when the control of enabling the autonomous vehicle to cross a solid line to change a lane is to be performed. In addition, the prompt may be sent in a voice manner. The preset operation is, for example, reversely flipping the steering switch. In addition, when the driver performs the preset operation, the autonomous lane change control is canceled. However, the processing operation is not shown in the figure.

Figure 6:
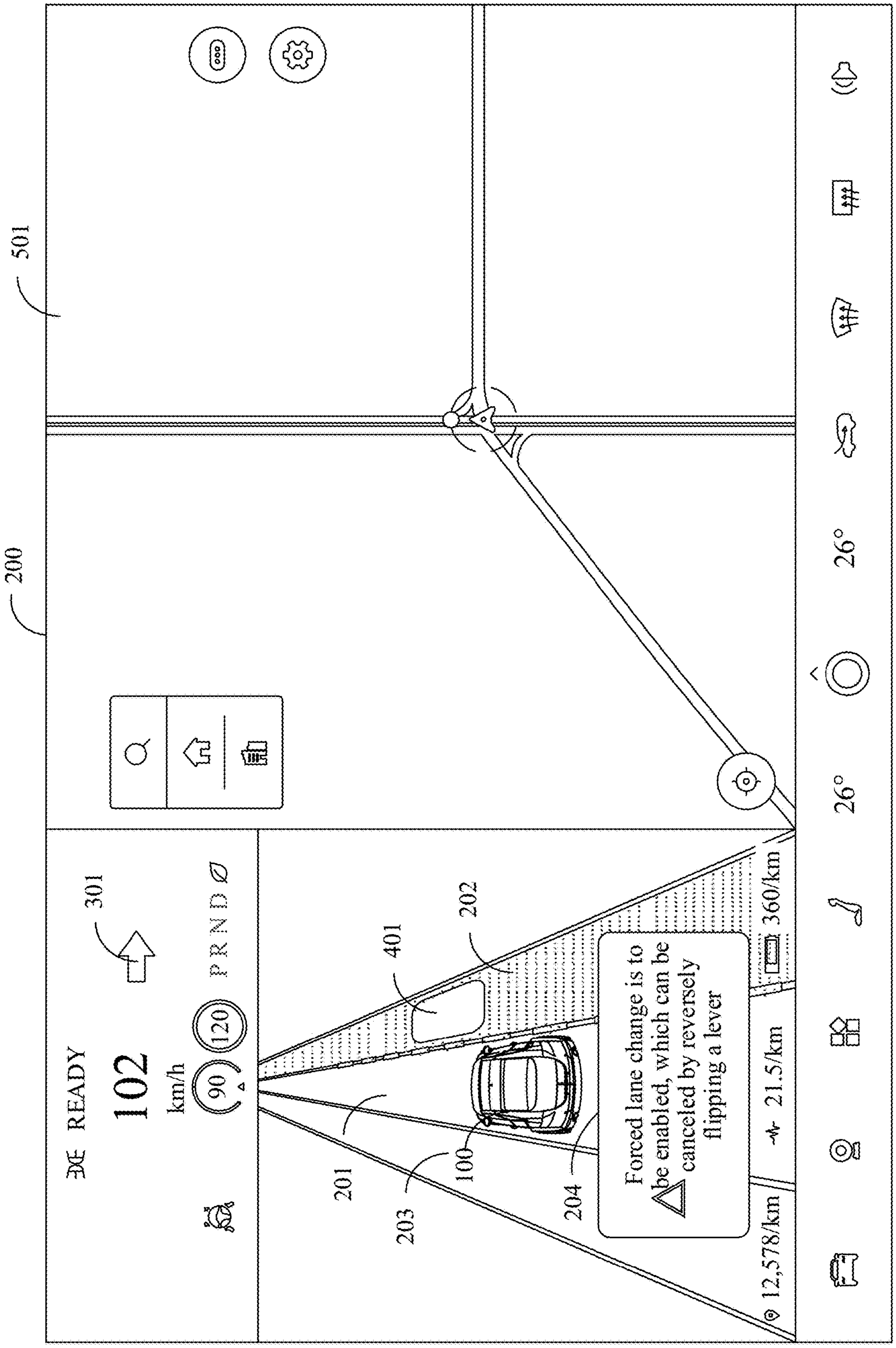
FIG. 6 is a schematic illustration diagram of an example of a displayed picture on an on-board display according to an embodiment of the application.

FIG. 6 shows an example of a navigation picture in this case. As shown in FIG. 6, in a navigation picture 200, a map 501 is displayed on a right side, and a road scene on which an autonomous vehicle 100 drives is schematically displayed on a left side. A current lane is 201, a left lane is 203, and a right lane (a target lane) is 202. The target lane 202 is further highlighted, and a target location 401 of the autonomous vehicle 100 is displayed on the target lane 202. In addition, a turn indication arrow 301 indicating a right turn is further displayed in an upper part of a left part of the displayed picture, and the turn indication arrow 301 is displayed in a blinking manner. In addition, in a text prompt area 204 of the navigation picture 200, a text "forced lane change is to be enabled" is displayed, to prompt the driver that the autonomous vehicle 100 is about to cross a solid line to change a lane. At the same time, a text "cancel by reversely flipping a lever" is displayed, to prompt the driver that a reverse operation can be performed on a steering lever to cancel to cross a solid line to change a lane.

In S214, whether a road condition of the target lane meets a lane change condition is determined (monitored) in real time. For example, when there is no other vehicle in a preset range on the target lane, it is determined that the lane change condition is met. When there is another vehicle in the preset range on the target lane (for example, refer to a case of "there is another vehicle that closely follows and drives behind the autonomous vehicle on the target lane in a process in which the autonomous vehicle changes the lane" shown in S218), it is determined that the lane change condition is not met.

When a determining result in S214 is "yes", control of enabling the autonomous vehicle to cross a solid line to change a lane continues to be performed until lane change is completed in S216. In addition, in S216, when autonomous lane change is completed, lane lines on two sides of the target lane are highlighted, for example, displayed in blue.

When a determining result in S214 is "no", "a lane change process is obstructed" is determined in S218, and the control of enabling the autonomous vehicle to cross a solid line to change a lane is stopped. In this case, a display manner of the navigation picture is the same as a display manner in S212.

Then, in S124, whether a condition for automatically returning to the current lane is met is determined, to be specific, whether a road condition of the current lane allows the autonomous vehicle to return to the current lane for normal driving is determined. For example, when there is no other vehicle in a preset range of the current lane, it is determined that the condition for automatically returning to the current lane is met. In this case, in S126, "lane change is canceled" is determined, and control of enabling the autonomous vehicle to return to the current lane is performed.

In addition, refer to a picture in S128. When the autonomous vehicle moves between the current lane and the target lane and drives along a solid lane line, if another vehicle on the left lane changes to the current lane of the autonomous vehicle, and the autonomous vehicle is prevented from returning to the current lane to drive. In this case, it is determined that the condition for automatically returning to the current lane is not met in S124. When it is determined that the condition for automatically returning to the current lane is not met in S124, in S128, a prompt is sent to the driver in a sound effect, text, and/or voice manner, to notify the driver to take over the autonomous vehicle. Then, in S130, when the driver takes over the vehicle by operating a steering wheel, the autonomous vehicle drives according to an operation by the driver.

According to an embodiment, when an autonomous lane change instruction (S100) generated due to the operation by the driver is received, and a cross-solid-line lane change permission switch is in an on state, control of enabling the autonomous vehicle to change a lane is performed. In this way, for example, in a case of emergency avoidance, an autonomous vehicle can cross a solid line to change a lane, to avoid an accident or inconvenience caused by mechanically driving according to a rule of "forbidding crossing a solid line to change a lane", so that flexibility of control of autonomous driving can be improved. In addition, an operation by the driver (a person) triggers the autonomous lane change, so that control of the person is maintained as a highest priority, subjective intervention permission of the person is maintained, and an autonomous driving technology better serves the person. Furthermore, highest determining permission of changing a lane is reserved for the driver, so that lack of autonomous driving technologies in determining of an emotion of the driver can be made up, personalized requirements of different drivers can be better met, and a driving intention of the driver can be better respected.

"Autonomous lane change" means that the vehicle changes a lane in an autonomous driving mode. Acceleration/deceleration instructions, steering instructions, and the like within lane change are not from operations performed by the driver on an accelerator pedal, a braking pedal, and a steering wheel, but from autonomous decision-making of a vehicle control apparatus.

The foregoing mainly describes a processing procedure when the lane line between the current lane and the target lane is a solid lane line. The following describes a processing procedure when the lane line is a dashed lane line.

When a determining result in S102 is "yes", to be specific, a lane condition for lane change is met, or when a determining result in S106 is "no", to be specific, the lane line between the current lane and the target lane is not the solid lane line (is the dashed lane line), in S104, lane change waiting is performed. Then, in S108, whether a road condition requirement for lane change is met is determined. For example, when there is no other vehicle in a preset range on the target lane, it is determined that the road condition requirement for lane change is met. When there is another vehicle in the preset range on the target lane (for example, refer to a case of "there is another vehicle in parallel with the autonomous vehicle on the target lane" shown in S112), it is determined that the road condition requirement for lane change is not met.

When a determining result in S108 is "no", to be specific, the road condition requirement for lane change is not met, in S112, waiting control is performed, to wait for the road condition of the target lane to change to a case in which the autonomous vehicle can be allowed to change the lane. In addition, the target lane is further highlighted in the navigation picture, for example, highlighted in red. The lane line between the current lane and the target lane is displayed by using a dashed line, and a color of the lane line may be the same as a displayed color of the target lane. In addition, a target location of the autonomous vehicle is further displayed on the target lane, and a shadow line is displayed on the target location, to prompt the driver that the autonomous vehicle cannot change to the target location currently.

Then, in S116, whether the road condition requirement for lane change is met is determined, to be specific, whether road conditions of the current lane and the target lane allow the autonomous vehicle to change the lane is determined. When a determining result in S116 is "yes", to be specific, the road condition allows the autonomous vehicle to change the lane, processing in S110 is performed. Details are described below. When a determining result in S116 is "no", to be specific, the road condition does not allow the autonomous vehicle to change the lane, processing in S120 is performed. In S120, lane change cannot be performed for a long time, and therefore, “lane change is canceled” is determined, and the current lane change is not performed. In addition, a prompt may be sent to the driver, for example, the lane line of the current lane is highlighted, for example, lane lines on two sides of the current lane are highlighted in blue.

When a determining result in S108 is “yes”, to be specific, the road condition requirement for lane change is met, in S110, control of enabling the autonomous vehicle to cross a solid line to change a lane is performed. To be specific, the autonomous vehicle is enabled to drive into the target lane by controlling the accelerator pedal, the steering wheel, and the like. In addition, the target lane is further highlighted in the navigation picture, and may be highlighted by using a color different from a color used when the road condition requirement for lane change is not met, for example, blue. The lane line between the current lane and the target lane is displayed by using a dashed line, and a color of the lane line may be the same as a displayed color of the target lane. In addition, a target location of the autonomous vehicle is further displayed on the target lane. The displayed target location does not include the “shadow line” in S112, to be specific, a display manner is different from a display manner in S112, to prompt the driver that the autonomous vehicle may change to the target location in this case.

In S114, whether a road condition of the target lane meets a lane change condition is determined (monitored). For example, when there is no other vehicle in a preset range on the target lane, it is determined that the lane change condition is met. When there is another vehicle in the preset range on the target lane (for example, refer to a case of “there is another vehicle that closely follows and drives behind the autonomous vehicle on the target lane in a process in which the autonomous vehicle changes the lane” shown in S122), it is determined that the lane change condition is not met.

When a determining result in S114 is “yes”, control of enabling the autonomous vehicle to cross a solid line to change a lane continues to be performed until lane change is completed in S118. In addition, in S118, when autonomous lane change is completed, lane lines on two sides of the target lane are highlighted, for example, displayed in blue.

When a determining result in S114 is “no”, “a lane change process is obstructed” is determined in S122, and the control of enabling the autonomous vehicle to cross a solid line to change a lane is stopped. In this case, a display manner of the navigation picture is the same as a display manner in S212. Then, processing in S124 is performed. The processing in S124 and subsequent processing are described above, so that details are not described herein again.

In the foregoing descriptions, the driver sends an autonomous lane change instruction by flipping a steering lever (a turn signal switch). However, this application is not limited thereto. For example, the autonomous lane change instruction may be further sent by a mid-air gesture operation or a voice operation. Herein, the operation of switching the turn signal switch to an on state by the driver, the mid-air operation, and the voice operation correspond to the first operation in this application.

In addition, in the foregoing descriptions, in S102 and S106, whether a type of the lane line between the current lane and the target lane is a solid lane line or a dashed lane line is determined, and different control is performed based on different lane line types. However, this application is not limited thereto. For example, processing in S102 and S106 may be omitted, and the solid lane line and the dashed lane line are not distinguished. To be specific, regardless of whether the type of the lane line between the current lane and the target lane is the solid lane line or the dashed lane line, when a cross-solid-line lane change permission switch is turned on, the lane line is considered as the dashed lane line.

Figure 7:
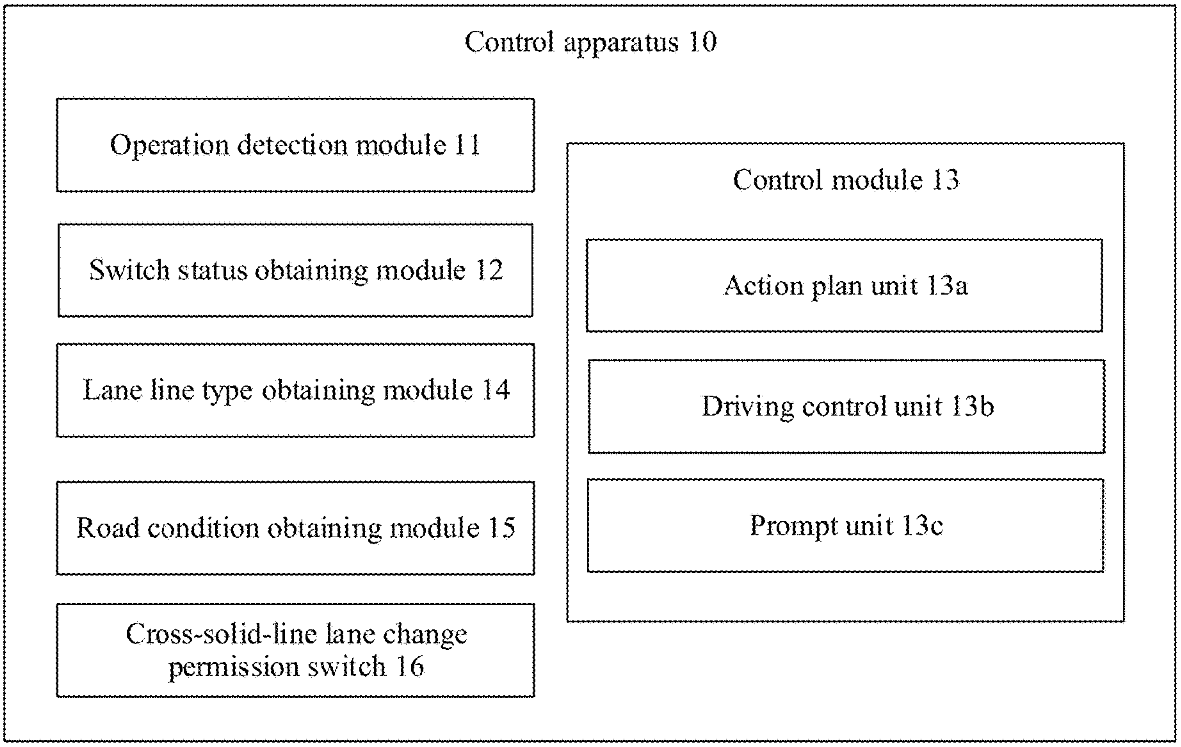
FIG. 7 is a schematic block diagram of a structure of a vehicle control apparatus according to an embodiment of the application.

This implementation further provides a vehicle control apparatus, and the vehicle control apparatus is configured to perform the foregoing vehicle control method. As shown in FIG. 7, the vehicle control apparatus 10 includes an operation detection module 11, a switch status obtaining module 12, a control module 13, a lane line type obtaining module 14, a road condition obtaining module 15, and a cross-solid-line lane change permission switch 16. These modules may be implemented by hardware or software. A manner is described above, and is not described herein again.

The operation detection module 11 detects an operation by a driver by obtaining a switch signal of a steering lever. The operation is used to send an autonomous lane change instruction, to instruct an autonomous vehicle 100 to automatically change from a current lane to a target lane.

In an embodiment, the cross-solid-line lane change permission switch 16 is a virtual switch, and is integrated in the control apparatus 10. An actual example of the switch may refer to FIG. 5.

The switch status obtaining module 12 is configured to detect status information of the cross-solid-line lane change permission switch 16. The status information indicates that the cross-solid-line lane change permission switch 16 is in an on state or an off state.

The control module 13 includes the foregoing action plan unit 13*a*, the foregoing driving control unit 13*b*, and the prompt unit 13*c*. The action plan unit 13*a* and the driving control unit 13*b* are described above, and are not described herein again. The prompt unit 13*c* is configured to control sending of various prompts, which include the sound effect prompt, the displayed text prompt, the displayed picture prompt, the voice prompt, and the like that are described above.

The lane line type obtaining module 14 is configured to obtain type information of a lane line between a current lane and a target lane. The type information is obtained, for example, based on a processing result of a road image captured by a camera 20.

The road condition obtaining module 15 is configured to obtain road condition information of the target lane. The road condition information is obtained, for example, based on a processing result of an image captured by the camera 20.

In the foregoing control method, processing in S100 to S130 and S200 to S218 is mainly performed by the control module 13. Information required during performance is correspondingly obtained by the operation detection module 11, the switch status obtaining module 12, the lane line type obtaining module 14, and the road condition obtaining module 15.

In addition, this implementation further provides a computer program, a computer-readable storage medium, and a computing device. The computing device includes a processor and the computer-readable storage medium. The computer-readable storage medium stores a computer program (program instructions). When the program instructions are executed by a computer (a processor), processing in S100 to S130 and S200 to S218 is performed.

Furthermore, this implementation further provides a vehicle including the foregoing vehicle control apparatus. The vehicle may be a household car, a cargo vehicle, a specialized vehicle like an ambulance, a fire truck, a police vehicle, or an engineering rescue vehicle, or the like.

Figure 8:
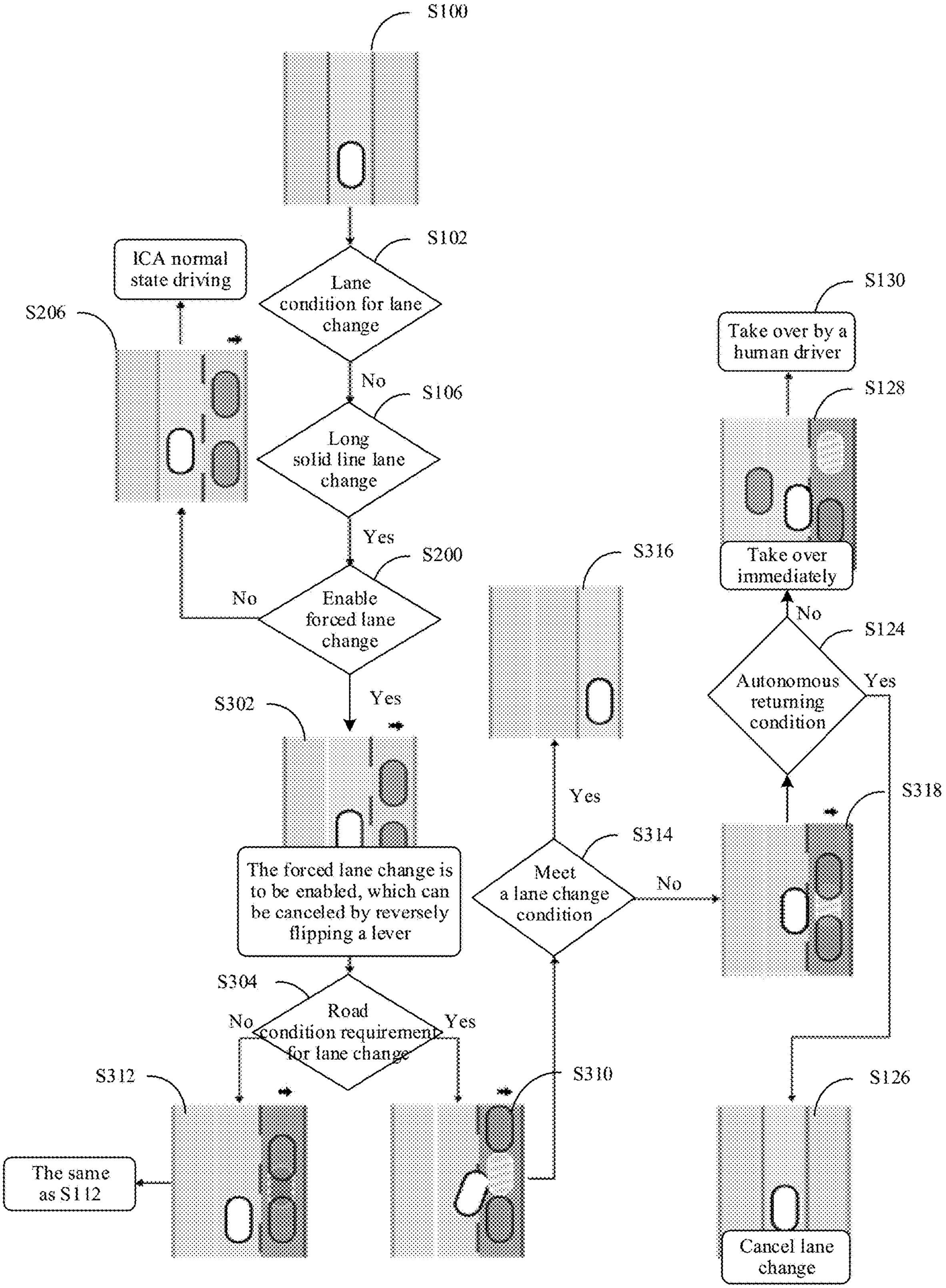
FIG. 8 is a schematic flowchart of autonomous lane change according to an embodiment of the application.
Figure 9:
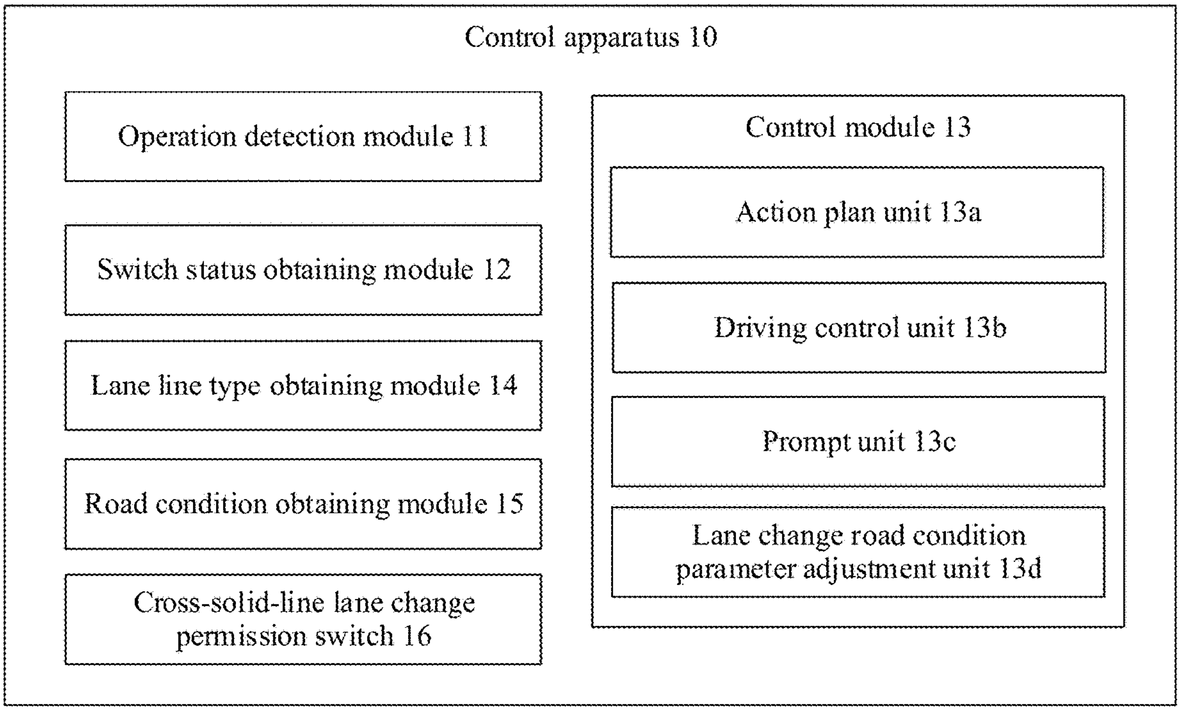
FIG. 9 is a schematic block diagram of a structure of a vehicle control apparatus according to an embodiment of the application.

Refer to FIG. 8 and FIG. 9. The following describes a vehicle control method and the like according to an embodiment of the application.

This implementation relates to a vehicle control method for autonomous lane change when an autonomous vehicle is in an autonomous driving mode. A main difference between this implementation and the foregoing implementation lies in that, when a driver sends an autonomous lane change instruction by operating a turn signal switch, the vehicle enables a "radical lane change" function, and adjusts a lane change road condition parameter, so that a road condition of a target lane is more easily met, and the vehicle can jump a queue on the target lane as much as possible based on an actual road condition while ensuring safety. "Lane change road condition parameter is met" herein may be, for example, whether a distance that is between an autonomous vehicle and another vehicle on the target lane after lane change is completed and that is obtained through prediction by the autonomous vehicle is greater than a distance threshold (referred to as a safe distance), whether there is another vehicle in a preset range on the target lane before the lane change is performed, whether a speed of the another vehicle is less than a speed threshold, and the like. "A road condition of a target lane is more easily met" means, for example, reducing the foregoing safe distance, narrowing the foregoing preset range, and increasing the foregoing preset vehicle speed threshold.

Refer to FIG. 8. The following describes a vehicle control method for autonomous lane change in an embodiment. In addition, in the following description, an example in which the autonomous vehicle is in an ICA mode is used for description. Furthermore, in the following description, for parts that are the same as those in the foregoing implementation, same reference numerals are added, and a description for the reference numerals is appropriately omitted or briefly described.

As shown in FIG. 8, in S100, in the ICA mode, an autonomous lane change instruction actively sent by a driver is obtained. Then, when the autonomous lane change instruction is obtained, in S102, whether a lane condition for lane change is met is determined, to be specific, whether a type of a lane line between a current lane and a target lane is a dashed lane line is determined.

When a determining result in S102 is "no", to be specific, the lane condition for lane change is not met, in S106, whether the lane line between the current lane and the target lane is a long solid lane line is determined. When a determining result in S106 is "no", to be specific, the lane line between the current lane and the target lane is not the long solid lane line, processing in S104 is performed, and lane change waiting is performed.

In addition, when a determining result in S102 is "yes", to be specific, the lane condition for lane change is met, processing in S104 is also performed. Herein, processing in S104 and subsequent processing are the same as the content shown in FIG. 4B, and detailed description for the processing is omitted.

In addition, when a determining result in S106 is "yes", to be specific, the lane line between the current lane and the target lane is the long solid lane line, in S200, whether a cross-solid-line lane change permission switch is in an on state is determined. When a determining result in S200 is "no", to be specific, a cross-solid-line lane change permission switch is in an off state, processing in S206 is performed.

When a determining result in S200 is "yes", to be specific, the cross-solid-line lane change permission switch is in an on state, processing in S302 is performed. In S302, lane change preparation control is performed. Herein, the lane change road condition parameter is adjusted, and to satisfy an adjusted lane change road condition parameter is easier than to satisfy the lane change road condition parameter before adjustment. Control of "adjusting the lane change road condition parameter" herein is an example of the first control in this application.

In addition, in a navigation picture, the target lane is highlighted, for example, highlighted in red. At the same time, the lane line between the current lane and the target lane is highlighted by using a dashed line. Furthermore, the driver is further notified, in a text and/or voice manner, that an operation of canceling to cross a solid line to change a lane may be performed. The operation is, for example, reversely flipping the steering lever, to be specific, switching the steering lever to a state to enable a right turn signal to turn off.

Then, in S304, whether a road condition requirement for lane change is met is determined, to be specific, whether road conditions of the current lane and the target lane allow the autonomous vehicle to change the lane is determined. For example, when there is no other vehicle in a preset range (after adjustment) on the target lane, it is determined that the road condition requirement for lane change is met. When there is another vehicle in the preset range on the target lane (for example, refer to a case of "there is another vehicle in parallel with the autonomous vehicle on the target lane" shown in S312), it is determined that the road condition requirement for lane change is not met. The preset range herein corresponds to the lane change road condition parameter in this application.

When a determining result in S304 is "no", to be specific, the road condition requirement for lane change is not met, in S312, waiting control is performed, to wait for the road condition of the target lane to change to a case in which the autonomous vehicle can be allowed to change the lane. In addition, the target lane is highlighted in the navigation picture, for example, highlighted in red, to prompt the driver that "the vehicle cannot change to the target lane now". In addition, in the navigation picture, the lane line between the current lane and the target lane is further highlighted by using a dashed line, to prompt the driver that "the vehicle considers the lane line between the current lane and the target lane as a dashed lane line". A color of the dashed lane line may be the same as a displayed color (red) of the target lane. In an embodiment, a highlighting manner on the target lane and the lane line between the target lane and the current lane in S312 is the same as a highlighting manner in S302.

When a determining result in S304 is "yes", to be specific, a road condition requirement for lane change is met, and when the driver does not perform an operation of canceling to cross a solid line to change a lane within a preset time period (for example, 5 seconds), or when the driver resets the steering lever (turns off the turn signal switch) and then flips the steering lever in a same direction again within a preset time period (for example, 5 seconds), in S310, control of enabling the autonomous vehicle to automatically cross a solid line to change a lane is performed. To be specific, the autonomous vehicle drives into the target lane by controlling an accelerator pedal, a steering wheel, and the like.

Herein, the lane change road condition parameter is adjusted to be more easily met than that in a common case (for example, the case in S108). Therefore, as shown in S310 in FIG. 8, when there is a small vehicle-to-vehicle distance (a gap) on the target lane, the autonomous vehicle may automatically change the lane, and jump a queue on the target lane.

In addition, in an embodiment, in S310, the target lane and the lane line between the target lane and the current lane are highlighted in the same manner as that in S310.

Then, in a lane change process, in S314, whether a road condition of the target lane meets a lane change condition is determined (monitored) in real time. For example, when there is no other vehicle in a preset range on the target lane, it is determined that the lane change condition is met. When there is another vehicle in the preset range on the target lane (for example, refer to a case of "the gap that the autonomous vehicle intends to jump into on the target lane within a lane change process of the autonomous vehicle becomes smaller" shown in S318), it is determined that the lane change condition is not met.

When a determining result in S314 is "yes", control of enabling the autonomous vehicle to cross a solid line to change a lane continues to be performed until lane change is completed in S316. In addition, in S316, when autonomous lane change is completed, lane lines on two sides of the target lane are highlighted, for example, displayed in blue.

When a determining result in S314 is "no", "a lane change process is obstructed" is determined in S318, and the control of enabling the autonomous vehicle to cross a solid line to change a lane is stopped. In this case, the target lane and the lane line between the target lane and the current lane are highlighted in the navigation picture in the same manner as that in S3.

Then, in S124, whether a condition for automatically returning to the current lane is met is determined, to be specific, whether a road condition of the current lane allows the autonomous vehicle to return to the current lane for normal driving is determined. Processing in S124 and subsequent S126, S128, and S130 is the same as processing in the foregoing implementations, and detailed description for the processing is omitted herein.

According to an embodiment, when the driver sends the autonomous lane change instruction by turning on the turn signal switch and the like, and the cross-solid-line lane change permission switch is in the on state, the lane change road condition parameter is adjusted to be more easily met, so that the vehicle can change a lane more easily, and a requirement of the driver can be responded to more appropriately.

The lane change road condition parameter herein indicates a road condition requirement for the target lane when the autonomous vehicle automatically changes a lane. To be specific, when the road condition of the target lane meets the road condition indicated by the lane change road condition parameter, the autonomous vehicle is allowed to automatically change a lane. When the road condition of the target lane does not meet the road condition indicated by the lane change road condition parameter, the autonomous vehicle is forbidden from automatically changing a lane.

In the foregoing description, when the lane line between the current lane and the target lane is the solid lane line, the lane change road condition parameter is adjusted. As a variant example of an embodiment, the lane change road condition parameter may also be adjusted when the lane line between the current lane and the target lane is the dashed lane line. To be specific, the adjustment of the lane change road condition parameter is not based on a prerequisite of knowing the type of the lane line.

In addition, this implementation further provides a vehicle control apparatus, which is applied to the vehicle 100, and configured to perform the foregoing vehicle control method. FIG. 9 is a schematic block diagram of a structure of the vehicle control apparatus. A difference from FIG. 7 lies in that, a control module of the vehicle control apparatus 10 in this implementation further includes a lane change road condition parameter adjustment unit **13*d* that is configured to adjust the lane change road condition parameter mentioned in the description of S302. Other structures are the same as those in FIG. 7**, and repeated descriptions for the structures are omitted herein.

In the foregoing control method, processing in S100 to S130, S200, S206, and S302 to S318 is mainly performed by the control module 13. Information required during performance is correspondingly obtained by an operation detection module 11, a switch status obtaining module 12, a lane line type obtaining module 14, and a road condition obtaining module 15.

In addition, this implementation further provides a computer program, a computer-readable storage medium, and a computing device. The computing device includes a processor and the computer-readable storage medium. The computer-readable storage medium stores a computer program (program instructions). When the program instructions are executed by a computer (a processor), processing in S100 to S130, S200, S206, and S302 to S318 is performed.

It should be noted that the foregoing are merely example embodiments and technical principles of this application. One of ordinary skilled in the art may understand that this application is not limited to embodiments described herein, and one of ordinary skilled in the art may make various obvious changes, readjustments, and replacements without departing from the protection scope of this application. Therefore, although this application is described in detail by using the foregoing embodiments, this application is not limited to the foregoing embodiments, and may further include more other equivalent embodiments without departing from the concept of this application. These embodiments all fall within the protection scope of this application.

What is claimed is:

1. A vehicle control method, comprising:

detecting a first operation by a driver of a vehicle, wherein the first operation is used to instruct the vehicle to change from a current lane to a target lane;

obtaining status information of a cross-solid-line lane change permission switch of the vehicle, wherein the cross-solid-line lane change permission switch is a physical switch or a displayed virtual switch, and the status information is determined based on a distance that a solid lane line extends in front of the vehicle;

in response to determining that the solid lane line does not extend for a threshold distance, performing first control when the solid lane line becomes a dashed lane line; and in response to determining that the solid lane line extends for the threshold distance, performing the first control when the first operation is detected and the status information indicates that the cross-solid-line lane change permission switch is in an on state, wherein the first control comprises enabling the vehicle to change a lane.

2. The vehicle control method according to claim 1, wherein the method further comprises:

obtaining type information of a lane line between the current lane and the target lane, wherein when the type information indicates that the lane line is a solid lane line, the first control further comprises sending a prompt that indicates that the lane line is the solid lane line.

3. The vehicle control method according to claim 2, wherein the prompt comprises a sound effect prompt, a displayed text prompt, and/or a voice prompt.

4. The vehicle control method according to claim 1, wherein the first control comprises:

enabling the vehicle to change the lane after a preset time period that starts from when the first operation is detected.

5. The vehicle control method according to claim 4, wherein the first control comprises:

enabling the vehicle to change the lane within the preset time period if a second operation is detected, wherein the second operation is used to instruct the vehicle to change from the current lane to the target lane.

6. The vehicle control method according to claim 1, wherein the first control further comprises adjusting a lane change road condition parameter that indicates a requirement for a road condition of the target lane when the vehicle changes the lane; and the vehicle control method further comprises:

obtaining road condition information of the target lane; and enabling the vehicle to change the lane when a road condition indicated by the road condition information satisfies a requirement indicated by the adjusted lane change road condition parameter.

7. The vehicle control method according to claim 1, wherein the first operation is to switch a turn signal switch to a state that a left turn signal or a right turn signal is on.

8. A vehicle control apparatus, comprising:

a processor, and a memory coupled to the processor to store instructions, which when executed by the processor, cause the processor to perform operations, the operations comprising:

detecting a first operation by a driver of a vehicle, wherein the first operation is used to instruct the vehicle to change from a current lane to a target lane;

obtaining status information of a cross-solid-line lane change permission switch of the vehicle, wherein the cross-solid-line lane change permission switch is a physical switch or a displayed virtual switch, and the status information is determined based on a distance that a solid lane line extends in front of the vehicle;

in response to determining that the solid lane line does not extend for a threshold distance, performing first control when the solid lane line becomes a dashed lane line; and in response to determining that the solid lane line extends for the threshold distance, performing the first control when the first operation is detected and the status information indicates that the cross-solid-line lane change permission switch is in an on state, wherein the first control comprises enabling the vehicle to change a lane.

9. The vehicle control apparatus according to claim 8, wherein the operations further comprises:

obtaining type information of a lane line between the current lane and the target lane, and when the type information indicates that the lane line is a solid lane line, the first control further comprises sending a prompt that indicates that the lane line is the solid lane line.

10. The vehicle control apparatus according to claim 9, wherein the prompt comprises a sound effect prompt, a displayed text prompt, and/or a voice prompt.

11. The vehicle control apparatus according to claim 8, wherein the operations further comprises:

enabling the vehicle to change the lane after a preset time period that starts from when the first operation is detected.

12. The vehicle control apparatus according to claim 11, wherein the operations further comprises:

enabling the vehicle to change the lane within the preset time period if a second operation is detected, wherein the second operation is used to instruct the vehicle to change from the current lane to the target lane.

13. The vehicle control apparatus according to claim 8, wherein the operations further comprises:

adjusting a lane change road condition parameter that indicates a requirement for a road condition of the target lane when the vehicle changes the lane;

obtaining road condition information of the target lane; and enabling the vehicle to change the lane when the road condition indicated by the road condition information satisfies a requirement indicated by the adjusted lane change road condition parameter.

14. The vehicle control apparatus according to claim 8, wherein the first operation is to switch a turn signal switch to a state that a left turn signal or a right turn signal is on.

15. The vehicle, comprising the vehicle control apparatus according to claim 8.

16. The vehicle according to claim 15, wherein the vehicle comprises an ambulance, a fire truck, a police car, or an engineering rescue vehicle.

17. A non-transitory computer-readable storage medium having instructions stored therein, which when executed by a processor, cause an apparatus to perform operations, the operations comprising:

detecting a first operation by a driver of a vehicle, wherein the first operation is used to instruct the vehicle to change from a current lane to a target lane;

obtaining status information of a cross-solid-line lane change permission switch of the vehicle, wherein the cross-solid-line lane change permission switch is a physical switch or a displayed virtual switch, and the status information is determined based on a distance that a solid lane line extends in front of the vehicle;

in response to determining that the solid lane line does not extend for a threshold distance, performing first control when the solid lane line becomes a dashed lane line; and in response to determining that the solid lane line extends for the threshold distance, performing the first control when the first operation is detected and the status information indicates that the cross-solid-line lane change permission switch is in an on state, wherein the first control comprises enabling the vehicle to change a lane.

18. The computer-readable storage medium according to claim 17, wherein the operations further comprise:

obtaining type information of a lane line between the current lane and the target lane, wherein when the type information indicates that the lane line is a solid lane line, the first control further comprises sending a prompt that indicates that the lane line is the solid lane line.

19. The computer-readable storage medium according to claim 18, wherein the prompt comprises a sound effect prompt, a displayed text prompt, and/or a voice prompt.

20. The computer-readable storage medium according to claim 17, wherein the first control comprises:

enabling the vehicle to change the lane after a preset time period that starts from when the first operation is detected.

* * * * *